United States Patent
Bernsen et al.

(10) Patent No.: US 10,200,108 B2
(45) Date of Patent: Feb. 5, 2019

(54) WIRELESS DOCKING SYSTEM FOR AUDIO-VIDEO RELAY

(71) Applicant: KONINKLIJKE PHILIPS N.V., Eindhoven (NL)

(72) Inventors: Johannes Arnoldus Cornelis Bernsen, Eindhoven (NL); Walter Dees, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 50 days.

(21) Appl. No.: 15/529,628

(22) PCT Filed: Nov. 27, 2015

(86) PCT No.: PCT/EP2015/077859
§ 371 (c)(1),
(2) Date: May 25, 2017

(87) PCT Pub. No.: WO2016/087320
PCT Pub. Date: Jun. 9, 2016

(65) Prior Publication Data
US 2017/0264359 A1    Sep. 14, 2017

(30) Foreign Application Priority Data

Dec. 3, 2014  (EP) ..................................... 14195997

(51) Int. Cl.
*H04B 7/155* (2006.01)
*H04W 76/14* (2018.01)
(Continued)

(52) U.S. Cl.
CPC ....... *H04B 7/15521* (2013.01); *G06F 1/1632* (2013.01); *H04L 7/0008* (2013.01);
(Continued)

(58) Field of Classification Search
CPC .............. H04B 7/15521; H04L 7/0008; H04L 65/4069; H04L 61/2092; H04L 61/103;
(Continued)

(56) References Cited

U.S. PATENT DOCUMENTS

| 2012/0265913 | A1 | 10/2012 | Suumaki | |
| 2014/0351477 | A1* | 11/2014 | Lee | G06F 1/1632 710/303 |
| 2014/0351479 | A1* | 11/2014 | Lee | H04W 76/14 710/303 |

FOREIGN PATENT DOCUMENTS

| EP | 2754328 | 7/2014 |
| EP | 2806704 A1 | 11/2014 |

(Continued)

OTHER PUBLICATIONS

"Wi-Fi Display Technical Specification version 1.1", Apr. 2014 (Apr. 24, 2014), XP055238797, Retrieved from the Internet: URL:https://www.wi-fi.org/downloads-registered/Wi-Fi_Display_Specification_v1.1.zip/Wi-Fi%2BDisplay%2BDisplay%2BTechnical%2BSpecification%2Bv1.1/21848, [retrieved on Jan. 5, 2016].

*Primary Examiner* — Jae Y Lee
(74) *Attorney, Agent, or Firm* — Larry Liberchuk

(57) ABSTRACT

In a wireless docking system a host (100) is arranged for docking a dockee (120) and relaying data packets from the dockee to an audio/video peripheral (110,111,112). The host is arranged for using a first host internet protocol [IP] address as address for the host for the wireless communication while docking the dockee, and using a second host IP address as address for the host for the wireless communication for setting up a direct connection to the audio/video peripheral, while the host operates as an audio/video data source towards the peripheral, and providing the second host IP address to the dockee. The dockee is arranged for using the second host IP address as source IP address for the (Continued)

dockee for exchanging data packets with the audio/video peripheral while transferring the data packets via the host. The audio/video peripheral can keep on using the same destination IP address and is not aware of actually communicating with the dockee.

16 Claims, 3 Drawing Sheets

(51) Int. Cl.
| | |
|---|---|
| *G06F 1/16* | (2006.01) |
| *H04N 7/18* | (2006.01) |
| *H04N 21/41* | (2011.01) |
| *H04N 21/4363* | (2011.01) |
| *H04N 21/4367* | (2011.01) |
| *H04L 7/00* | (2006.01) |
| *H04L 29/06* | (2006.01) |
| *H04N 21/2387* | (2011.01) |
| *H04W 84/12* | (2009.01) |
| *H04L 29/12* | (2006.01) |
| *H04N 21/4223* | (2011.01) |

(52) U.S. Cl.
CPC ......... *H04L 65/4069* (2013.01); *H04N 7/183* (2013.01); *H04N 21/2387* (2013.01); *H04N 21/41* (2013.01); *H04N 21/4367* (2013.01); *H04N 21/43637* (2013.01); *H04W 76/14* (2018.02); *H04L 61/103* (2013.01); *H04L 61/2015* (2013.01); *H04L 61/2092* (2013.01); *H04L 61/6013* (2013.01); *H04N 21/4223* (2013.01); *H04W 84/12* (2013.01)

(58) Field of Classification Search
CPC ............ H04L 61/6013; H04L 61/2015; H04N 21/2387; H04N 21/4367; H04N 21/43637; H04N 7/183; H04N 21/41; H04N 21/4223; G06F 1/1632; H04W 76/14; H04W 84/12
See application file for complete search history.

(56) References Cited

FOREIGN PATENT DOCUMENTS

| | | |
|---|---|---|
| WO | WO 2012117306 A1 | 9/2012 |
| WO | WO2013038359 A1 | 3/2013 |
| WO | WO2014139868 A1 | 9/2014 |
| WO | WO2014189325 A1 | 11/2014 |

\* cited by examiner

WIRELESS DOCKING SYSTEM FOR AUDIO-VIDEO RELAY

FIELD OF THE INVENTION

The invention relates to a wireless docking system comprising at least one host and at least one dockee, the host and the dockee arranged for docking via wireless communication, the host arranged for accommodating at least one wireless docking environment comprising at least one audio/video peripheral, a docking session enabling the dockee to use the audio/video peripheral. The host comprises a host communication unit for accommodating said wireless communication, and a host processor arranged for, in the docking session, docking the dockee and relaying data packets from the dockee to the audio/video peripheral and/or from the audio/video peripheral to the dockee. The dockee comprises a dockee communication unit for accommodating said wireless communication, and a dockee processor arranged for, in the docking session, docking with the host.

The invention relates to the field of wireless communication, e.g. via Wi-Fi, and more specific to a setup for a wireless docking system having audio and/or video rendering capabilities.

BACKGROUND OF THE INVENTION

Wired docking stations for portable electronic devices typically have only a single physical docking connector to dock one device at a time. The docking station may provide the portable device with power and peripheral functions not provided by the device itself, for example a large(r) screen or high(er) quality speakers.

Wireless docking is known, for example, from WO 2012/117306A1. A wireless docking station (called a host) enables a mobile device (called a dockee) to access to its peripherals via wireless communication between the dockee and the host. The wireless docking station enables applications in the dockee to receive audio and/or video (AV) data. The AV data may originate from the peripherals or external sources of the host, and is transferred in the direction of the dockee device in a data stream, usually called downstream. Also an application in the dockee device may generate or process AV data, and send a stream of AV data to the host device, usually called upstream.

SUMMARY OF THE INVENTION

In known wireless docking systems, internet data packets containing the audio and/or video data, also called content data packets, have to be relayed by the host between the dockee and the peripheral. However, as the data rate of the content data packets may be high and timing of relaying may be critical, the relaying effort of the host is substantial. Also, there are (legacy) audio/video peripherals that require a direct connection between the device providing the AV data source and the audio/video peripheral, and hence are not built to function within such a relayed system.

It is an object of the invention to provide a system for wireless docking that reduces the required relaying effort while maintaining compatibility with an audio/video peripheral requiring a direct connection between the AV data source and the audio/video peripheral.

For this purpose, a system, devices and methods are provided as defined in the appended claims.

In the host in the wireless docking system as described in the opening paragraph, the host processor is arranged for using a first host internet protocol [IP] address as source IP address of the host for the wireless communication while docking the dockee, using a second host IP address as source IP address of the host for the wireless communication for setting up a direct connection to the audio/video peripheral, while the host operates as an audio/video data source towards the peripheral, providing the second host IP address to the dockee.

In the dockee in the wireless docking system as described in the opening paragraph, the dockee processor is arranged for communicating with the host using the first host IP address as destination IP address, receiving the second host IP address from the host, using the second host IP address as source IP address of the dockee while exchanging data packets with the audio/video peripheral while transferring the data packets via the host.

A method of wireless docking is provided for use in the host in the wireless docking system as described in the opening paragraph. The method comprises docking the dockee and relaying data packets from the dockee to the audio/video peripheral and/or from the audio/video peripheral to the dockee, using a first host IP address as source IP address of the host for the wireless communication while docking the dockee, and using a second host IP address as source IP address of the host for the wireless communication for setting up a direction connection to the audio/video peripheral, while the host operates as an audio/video data source towards the peripheral, providing the second host IP address to the dockee.

A method of wireless docking is provided for use in the dockee in the wireless docking system as described in the opening paragraph. The method comprises docking with the host, communicating with the host using the first host IP address as destination IP address, receiving the second host IP address from the host, using the second host IP address as a source address for exchanging data packets with the audio/video peripheral while transferring the data packets via the host.

The wireless communication is based on standardized protocols, in particular the internet protocol suite [4]. In this document internet protocol address means an address according to the internet protocol suite, usually called IP address. Similarly, link layer device addresses are discussed which are usually called Media Access Control (MAC) addresses.

The above features of the host and dockee in the wireless docking system have the effect of substituting the internet protocol address at the source by a special internet protocol address, called second host internet protocol address, as provided by the host to the dockee. The special internet protocol address is specifically used by the host for setting up a direct connection to the audio/video peripheral. A direct connection between the WDC and the A/V peripheral can be established using e.g. Wi-Fi Direct, TDLS, 802.11s, 802.11 ad-hoc. Tunneled Direct Link Setup (TDLS) is a seamless way to stream media and other data faster between devices already on the same Wi-Fi network as defined by the Wi-Fi Alliance. TDLS is a technology that enables devices to link directly to one another when connected to a traditional Wi-Fi network.

A (legacy) audio/video peripheral that requires a direct connection would not expect the source internet protocol address to be changed during operation, and hence this is likely to lead to errors/malfunctioning of the audio/video peripheral if this would happen. Due to the address substitution at the dockee the host does not need to replace the internet protocol address, and the processing during relaying is reduced, whilst maintain compatibility with (legacy) audio/video peripherals that require a direct connection. In detail, the processing during relaying is reduced because the IP address is in the header of an IP packet. But the IP packets are encapsulated in MAC packets, which are of different length. It is relatively simple for a device to do something based on the destination MAC address of a packet, because that is in the first bytes of a received MAC packet. But an IP address can be anywhere in the payload of a MAC packet. Manipulation of data in IP packets usually requires that the IP packets are extracted first from the MAC packets, manipulated and encapsulated again in MAC packets. This is typically the operation of a NAT router, but this operation is quite heavy to perform on a typical wireless docking station.

The audio/video peripheral is enabled to receive the relayed data packets having the second host internet protocol address as a source address so as to emulate a direct connection between the audio/video peripheral and the dockee. Advantageously the audio/video peripheral will see a connection similar to a direct connection to a source, while the relaying effort is reduced as internet protocol addresses do not need to be replaced by the host during relaying.

In an embodiment of the wireless docking system, the data packets comprise control data packets and content data packets, and the dockee has a dockee IP address. The dockee processor is arranged to
   use the dockee IP address as source IP address of the dockee for exchanging control data packets with the audio/video peripheral while transferring the control data packets via the host, and
   use the second host IP address as source IP address of the dockee for exchanging the content data packets with the audio/video peripheral while transferring the content data packets via the host, and
the host processor being arranged for, when relaying the control data packets,
   replacing the dockee IP address by the second host IP address as the source IP address.

The above features have the effect that for control packets standard relaying is used. Such control packets do not have a high data rate and are not time critical. On the other hand, content data packets which have a high data rate and are time critical are relayed with reduced effort.

In an embodiment of the wireless docking system, the data packets have a source link address on a link layer indicating a device link address of a device that originated the data packet and a destination link address indicating a device link address of a device that is the final destination of the data packet, and the host processor is arranged for
   receiving a data packet to be relayed from the dockee to the audio/video peripheral, the packet source link address being a dockee link address,
   modifying the data packet source link address by replacing the dockee link address by a host link address used whilst setting up the direct connection between the host and the peripheral, and
   relaying the modified data packet to the audio/video peripheral.

The above features have the effect that for relayed data packets a link address substitution is used. The packets arriving at the audio/video peripheral now have, as the source address, the host link address that is known to the audio/video peripheral as it has also been used as a source link address by the host when setting up a direct connection to the audio/video peripheral.

In the above wireless docking system the data packets may have a source link address on a link layer indicating a device link address of a device that originated the data packet and a destination link address indicating a device link address of a device that is the final destination of the data packet. Optionally the host processor is arranged for
   receiving a data packet to be relayed from the audio/video peripheral to the dockee, the packet destination link address being a host link address used whilst setting up a direct connection between the host and the peripheral,
   modifying the data packet destination link address by replacing the host link address by the dockee link address, and
   relaying the modified data packet to the dockee.

The above features have the effect that for relayed data packets towards the dockee a link address substitution is used. The packets from the audio/video peripheral now have, as the destination address, the dockee link address. So the audio/video peripheral can keep on using the same destination link address. The audio/video peripheral is not aware that it is actually communicating with the dockee instead of with the host while the dockee is docked.

In an embodiment of the wireless docking system, the host processor is arranged for
   setting up a direct connection to the audio/video peripheral, and operating a predefined protocol of control data packets, the control data packets in the protocol comprising a sequence of request data packets and response data packets that have to be exchanged to subsequently enable exchanging content data packets, and including, in the sequence, additional data packets, the additional data packets causing the audio/video peripheral to stay coupled to the host.

The above features have the effect that the peripheral will stay connected during waiting period after the connection was set up and the predefined protocol of control data packets was performed until the dockee arrives and starts docking. Advantageously the dockee may get access to the peripheral more quickly, as a part of the predefined protocol of control data packets has already been performed.

In an embodiment of the wireless docking system, the host processor is arranged for selecting a set of capabilities that is common for most dockees and start streaming content to the peripheral using the set of capabilities. Advantageously a dockee may immediately start using the set of capabilities.

In an embodiment of the wireless docking system, the host processor is arranged for pausing the content when switching between the host and the dockee or vice versa. Pausing the content will make the transition smoother and prevent the user to see glitches.

Further preferred embodiments of the devices and methods according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which.

The figures are purely diagrammatic and not drawn to scale. In the Figures, elements which correspond to elements already described may have the same reference numerals.

DETAILED DESCRIPTION OF EMBODIMENTS

Figure 1:
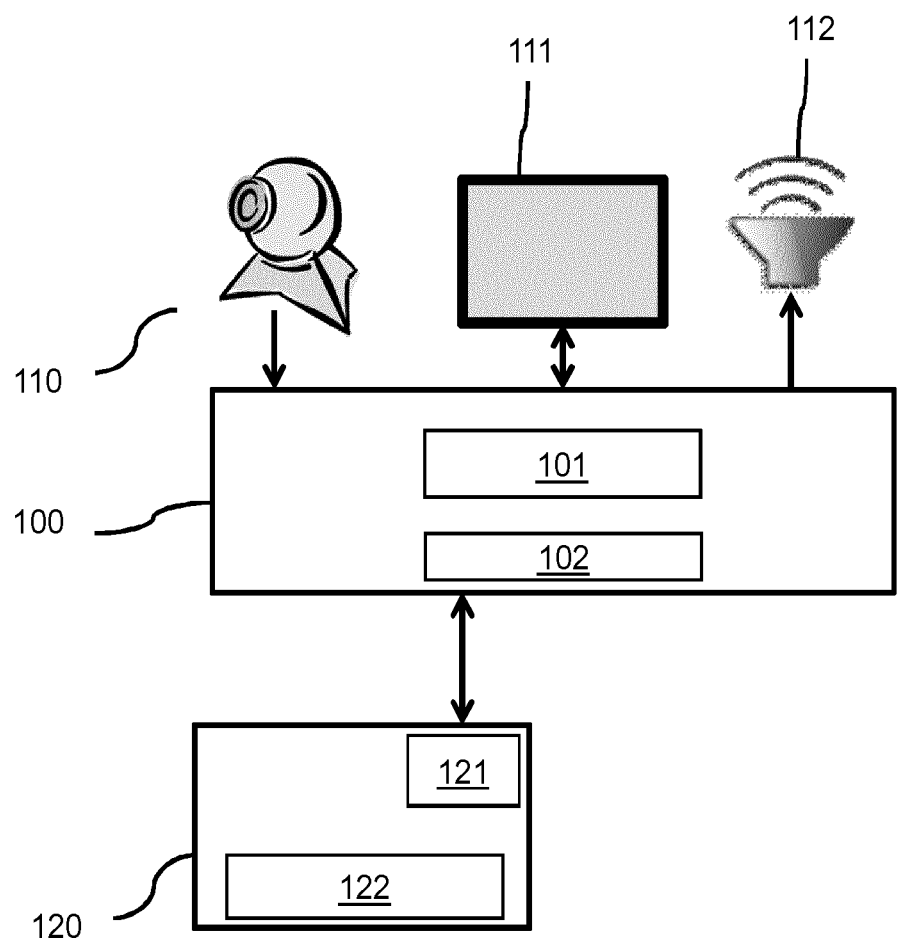
FIG. 1 shows a wireless docking system.

Wireless docking is about enabling portable or mobile devices (so called wireless dockees, WDs or just dockees) to wirelessly connect to a group of peripherals, so that applications on the dockee device can make use of these peripherals to improve the experience and productivity of working/interacting with these applications. The interfacing to the peripherals is performed by a docking center (so-called wireless docking host, WDH or just host).

Possible dockees include (but are not limited to) mobile phones, laptops, tablets, portable media players, cameras, electronic watches. Possible WDHs include (but are not limited to) dedicated wireless docking station devices, display devices, audio devices, printers, PCs. Possible peripherals include (but are not limited to) wireless mice, keyboards, display devices, audio devices, webcams, printers, storage devices, USB hubs. In particular audio/video peripherals are discussed that are able to receive and/or generate audio data, video data or a combination of video and audio data, shortly indicated as a sink or a source of content data.

The focus of this document is efficient relaying in a wireless docking station (host) of data packets exchanged between a legacy Wi-Fi Display or Miracast or Wi-Fi Direct Services Display service sink device and a wireless dockee. Similarly a legacy source device may exchange packets by relaying via the host. This is not described here, but may easily be understood by exchanging the Wi-Fi Display Source and Wi-Fi Display Sink in the applications as described below.

The Wi-Fi Display or Miracast or Wi-Fi Direct Services Display service Sink device is first paired with a wireless docking center, so that Wi-Fi link is created between them. This is part of the setup of a wireless docking environment. After the pairing an as part of the coupling between the wireless docking center and the Wi-Fi Display Sink device, they may exchange their capabilities with respect to Wi-Fi Display, the wireless docking center may set Wi-Fi Display parameters to desired values in the Wi-Fi Display and Wi-Fi Display may set Wi-Fi Display parameters to desired values in the wireless docking center. Capability exchange and parameter setting may also happen after the coupling, e.g. before a dockee docks or after a dockee has undocked from the wireless docking center. Further information on the legacy Wi-Fi Display or Wi-Fi Direct Services Display service sink device can be found, inter alia, in the Wi-Fi Display Technical Specification issued by the Wi-Fi Alliance, e.g. version 1.1 dated 24 Apr. 2014.

A wireless docking environment consists of one or more peripherals that are connected by wire (e.g. USB) or wirelessly (e.g. Wi-Fi Direct, Bluetooth, etc.) to the wireless docking station. The peripherals can be made available by the wireless docking station over a Wi-Fi link to a wireless dockee.

The wireless dockee pairs with the wireless docking station, and a Wi-Fi link is created between them. After this, the wireless dockee can use the peripherals that the wireless docking station has made available, as if they were directly connected to the wireless dockee.

FIG. 1 shows a wireless docking system. The prior art system includes a host 100 for wireless communication with a dockee 120, for example a mobile phone, laptop or tablet computer. The dockee 120 can, for example, be a Miracast source, and is described in detail below. The host is coupled to a number of audio/video peripherals 110,111,112 for rendering or providing audio or video (AV) data, and any one of the audio/video peripherals 110,111,112 can be, for example, a Miracast sink. It is noted that in this document audio/video data or AV data is used for any type of video data, audio data or a combination of video and audio data. The audio/video peripherals may include video output devices like a beamer or a display screen 111, video input devices like a camera or webcam 110, in graphical interactive devices like a touch screen, audio input/output devices like a loudspeaker system 112, a headphone and/or a microphone. Further peripherals may include user control devices like a mouse, a 3D gesture detection device or a room control unit; data processing devices like a data storage unit or a printer.

In wireless docking, a dockee connects wirelessly to a host in order to hook up to peripherals provided by the docking station. The devices support wireless communication, for example Wi-Fi according to version 'n' (as defined in IEEE 802.11n).

The wireless docking system as discussed now has at least one host 100 and at least one dockee 120, and the host and the dockee arranged for docking via wireless communication. The host accommodates at least one wireless docking environment comprising at least one audio/video peripheral 110,111,112 that is connected to the host by Wi-Fi. A docking session is started by a dockee. When a dockee has successfully docked according to the standardized docking protocol, the docking session enables the dockee to use an audio/video peripheral selected in the wireless docking environment.

The host 100 has a host communication unit 102 for accommodating said wireless communication, for example a Wi-Fi unit, well known as such. The host further has a host processor 101 arranged for docking at least one dockee. The process of docking a wireless device to a wireless docking host or center (WDH or WDC) is a process of establishing a data link via the available radio channel such as Wi-Fi, Wireless Serial Bus or Bluetooth, and is known as such as discussed above with reference to WO 2012/117306A1. A description of Bluetooth can be found, for example, in Bluetooth Specification, Core Package version 2.1+EDR, issued: 26 Jul. 2007. The docking process includes providing access to one or more peripherals for the dockee device. Thereto the host processor is arranged for, in the docking session, docking the dockee and relaying data packets from the dockee to the audio/video peripheral and/or from the audio/video peripheral to the dockee.

The dockee 120 has a dockee communication unit 121 for accommodating said wireless communication with the host. The dockee device further has a dockee processor 122 arranged for, in the docking session, docking with the host device for getting access to the at least one peripheral.

The wireless docking system is arranged for address substitution to reduce the required relaying effort when using a legacy audio/video peripheral, as follows. The host processor is further arranged for using, as a source address, a first host internet protocol address for the wireless communication while docking the dockee. As usual, the first host internet protocol address serves not only as a source address, but also as a destination address for communication via the network.

In addition, the host processor uses a different second host internet protocol address. The second host internet protocol address is used as a source address for the wireless communication while setting up a direct connection to the audio/video peripheral. Setting up the connection with the audio/video peripheral may take place before or after the dockee has docked. The host processor also provides the second host internet protocol address to the dockee. The dockee processor is arranged for communicating with the host using the first host internet protocol address as a destination address, and for receiving the second host internet protocol address from the host. Subsequently, the dockee processor is arranged for using the second host internet protocol address as a source address for exchanging data packets with the audio/video peripheral while transferring the data packets via the host. This way, the audio/video peripheral will not be able to distinguish relayed data exchanged with the dockee and data exchanged with the host (e.g. during a setup phase when the host and audio/video peripheral are coupled), because the data is always exchanged with the same internet protocol address. When there is no dockee docked, the host performs the exchange, while when a dockee is docked, the host will not do the exchange itself but relay between dockee and audio/video peripheral. This is necessary, because for example a Miracast sink peripheral does not expect the source internet protocol address to be changed during operation, and hence this is likely to lead to errors/malfunctioning of the audio/video peripheral if this would happen.

Figure 2:
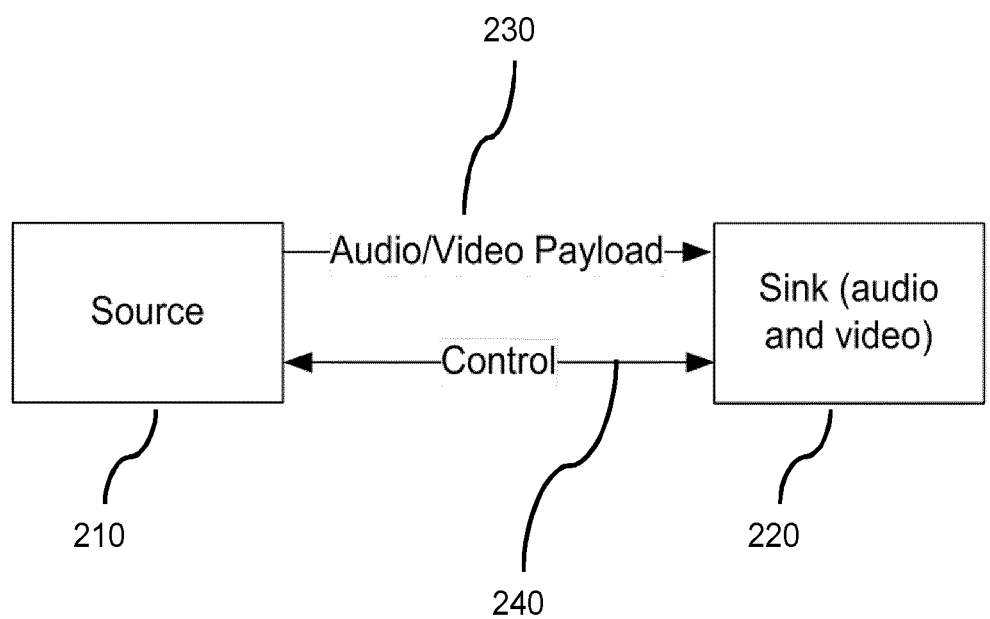
FIG. 2 shows an example of a source and a sink exchanging data packets.

FIG. 2 shows an example of a source and a sink exchanging data packets. The Figure shows the basic topology of the WFD devices in a WFD session, i.e. according to the Wi-Fi Display system [1], chapter 3. One WFD source 210 and one WFD sink 220 are connected for AV streaming and optional user data exchanges. Audio/video Payload packets, also called content data packets 230, are transferred from the source to the sink. Also control data packets 240 are exchanged between the source and the since, as further elucidated with reference to FIG. 3.

In the wireless docking system a host will be in between the source and the sink, and will be relaying the data packets as discussed with reference to FIG. 1. To accommodate sink devices that are expecting a direct connection to the source, the host is provided with said address substitution to reduce the required relaying effort when using a legacy audio/video sink. So, in the WFD example, the data packets comprise control data packets 240 and content data packets 230.

For both the control packets and the content data packets, the Wi-Fi Direct Sink has to see a constant IP address of the Wi-Fi Direct Source for both types of packets and the IP address (not the port number) must be the same for both types of packets. Because of the limited number of control packets, the WDC may not to use said IP address substitution and instead, take the IP packets out from the MAC packets from the dockee (WD), change the source IP address to the IP address from the WDC, re-packetize the IP packets in MAC packets and send them to the Wi-Fi Display Sink and the same for the destination IP address that the WD uses when sending packets to the Wi-Fi Display Source (WDC changes the destination IP address from its own to that of the WD). This requires much processing for the content data, so it is advantageous that the IP address substitution system is used for at least content data packets. It may additionally also be used for the control packets.

Optionally, in the wireless docking system, the dockee has a dockee internet protocol address and the dockee processor is arranged to use the dockee internet protocol address as a source address for exchanging control data packets with the audio/video peripheral while transferring the control data packets via the host, and use the second host internet protocol address as a source address for exchanging the content data packets with the audio/video peripheral while transferring the content data packets via the host. Also the host processor is arranged for, when relaying the control data packets, replacing, as a source address, the dockee internet protocol address by the second host internet protocol address.

To accommodate sink devices that are expecting a direct connection to the source, the host may also be provided with address substitution on the link layer to reduce the required relaying effort when using a legacy audio/video sink. The Wi-Fi Display Sink wants to see one constant MAC address of the Wi-Fi Display Source for all communication with the Wi-Fi Display Source, also for security reasons, where the MAC address typically plays a role in determining the link keys. Also, the IP address to MAC address mapping should remain consistent from the point of view of the Wi-Fi Display Sink.

In an embodiment the address substitution on the link layer is detailed as follows. When a WD, acting as a Wi-Fi Display Source, sends a Wi-Fi MAC packet that is meant for the Wi-Fi Display Sink, the WD uses the following MAC addresses in the packet header of such a packet. Note that the SA and DA are the normal addresses in any type of link technology, such as Ethernet, and that in Wi-Fi (or 802.11) two more MAC addresses can be used.

On the link from WD to WDC the data packets have the following link addresses:

Source Address (SA): MAC address of WD

Destination Address (DA): MAC address of Wi-Fi Display Sink

Transmitting STA address (TA): MAC address of WD

Receiving STA address (RA): MAC address of WDC

Normally, the WDC would forward such a packet using the following addresses:

Source Address (SA): MAC address of WD (unchanged)

Destination Address (DA): MAC address of Wi-Fi Display Sink (unchanged)

Transmitting STA address (TA): MAC address of WDC (changed to the transmitter on this link)

Receiving STA address (RA): MAC address of Wi-Fi Display Sink (changed to the receiver on this link)

However, the Wi-Fi Display Sink expects to receive packets where the SA and TA are both that of the WDC. Therefore, the WDC now forwards this packet in the following way (link address or MAC address substitution), where the underlined device address has been changed due to said substitution.

Source Address (SA): <u>MACaddressofWDC</u>

Destination Address (DA): MAC address of Wi-Fi Display Sink

Transmitting STA address (TA): MAC address of WDC

Receiving STA address (RA): MAC address of Wi-Fi Display Sink

A Wi-Fi Display Sink will send a MAC packet to the Wi-Fi Display Source in the following way, because it thinks that the WDC's MAC address is that of the Wi-Fi Display Source.

Source Address (SA): MAC address of Wi-Fi Display Sink
Destination Address (DA): MAC address of WDC
Transmitting STA address (TA): MAC address of Wi-Fi Display Sink
Receiving STA address (RA): MAC address of WDC The WDC knows that the wrong Destination MAC address has been used, so in forwarding this MAC packet, the WDC changes the addresses in the following way, where the underlined device address has been changed due to said substitution.

Source Address (SA): MAC address of Wi-Fi Display Sink
Destination Address (DA): MACaddressofWD
Transmitting STA address (TA): MAC address of WDC
Receiving STA address (RA): MAC address of WD In Wi-Fi, Peer-to-Peer devices, such as Wi-Fi Display Sources and Sinks, talk directly to one another. One of the two acts as a P2P Group Owner (GO), the other as a P2P Client. The GO runs a DHCP host through which the Client obtains an IP address. Because all MAC packets between GO and Client are done on one direct link, they know each other's MAC address. Furthermore, Wi-Fi Peer-to-Peer devices need to create their own MAC addresses, called the P2P Interface address, when they start a P2P Group or become member of a P2P Group. This MAC address must remain constant though during the time that they are a member of a P2P Group for communicating within this P2P Group. A P2P further has a so-called P2P Device address, which is a "globally" unique MAC address that is used for any communication of the P2P device when it is not operating in the P2P group.

Although there is no real need for a P2P device to perform ARP (Address Resolution protocol), a sink may do the ARP. So ARP must be handled in a specific way for the MAC address substitution to work. Through ARP, a device sends a request using the broadcast MAC address of all 'one's to ask for the MAC address of a device with the IP address noted in the ARP request. The device that has the requested IP address, or an ARP proxy, which maintains a table of IP address MAC address mappings, responds to the requester with the requested MAC address. A Wi-Fi Display Sink may do an ARP request to get the MAC address of the Wi-Fi Display Source using the IP address of the Wi-Fi Display Source. The latter's IP address is constant because of the IP address substitution. In order that the MAC address obtained by the Wi-Fi Display Sink remains constant as well in case a WD is docked, there are two embodiments proposed.

In a first embodiment the WDC responds to an ARP request on behalf of the WD with the MAC address of the WDC used for communication between the WDC and the Wi-Fi Display sink and must not forward the ARP request to the WD or any other device. Since the WDC has to reply the same to a Wi-Fi Display Sink's ARP request when there is no WD docked, this rule can be simplified with the following one.

"When a Wi-Fi Display Sink performs an ARP request for the MAC address of the Wi-Fi Display Source (by filling in the IP address of the Wi-Fi Display Source), the WDC must respond with its own MAC address and not forward this ARP request to any docked WD or any other connected device. The WDC acts as a special ARP proxy this way."

In a second embodiment the WD responds to an ARP request with the MAC address of the WDC, and not its own MAC address. To this end, both MAC addresses that are used for communication between the WDC and the Wi-Fi Display sink must be communicated with the WD so that it knows how to interpret and respond to an ARP request from the Wi-Fi Display sink.

Figure 3:
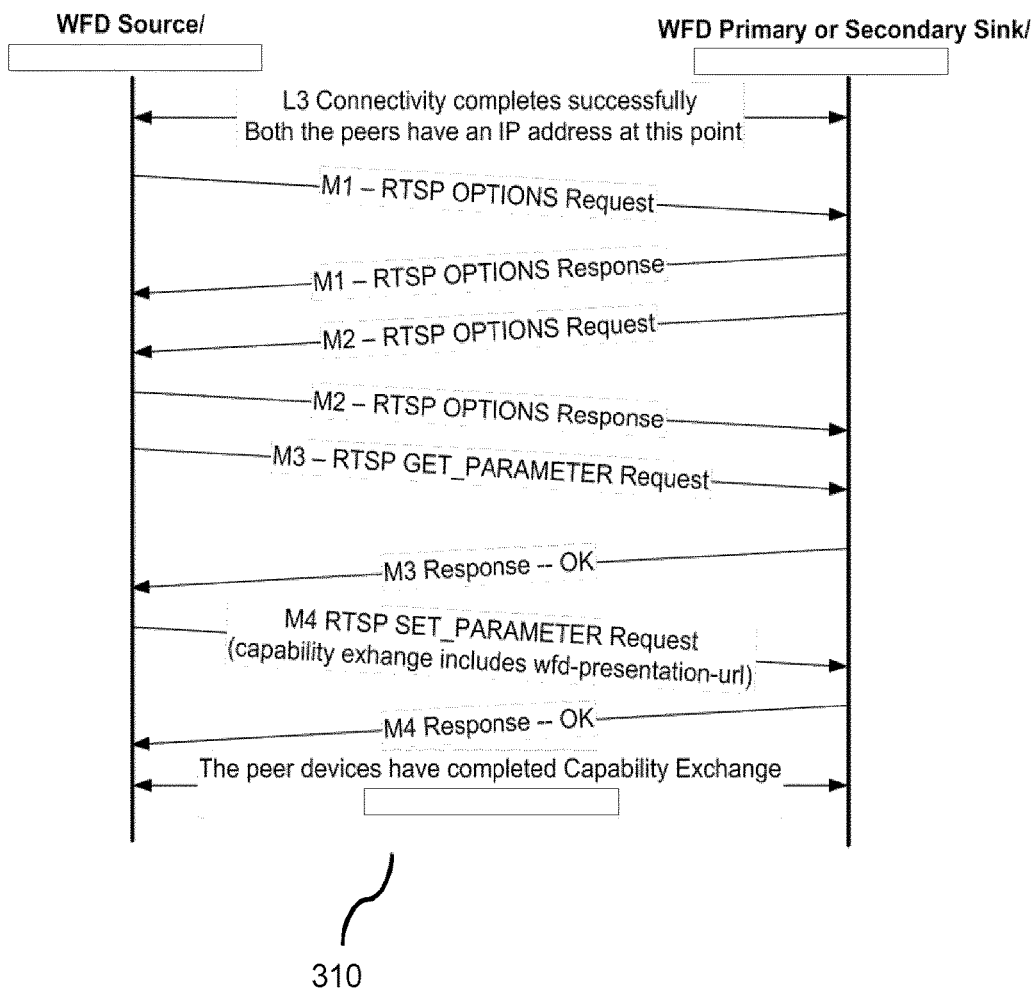
FIG. 3 shows an example of a protocol for an audio/video session.

FIG. 3 shows an example of a protocol for an audio/video session. In the Figure a schematic diagram shows a sequence 310 of messages according to the Wi-Fi display (WFD) system (see 4.6 in [1]), in practice control data packets, that are to be exchanged between source and sink WFD devices.

Upon successful establishment of connectivity between WFD devices attempting to establish a WFD session, the connected devices determine the set of parameters to be used for the subsequent WFD session as part of the WFD Capability Negotiation phase of WFD connection setup. The next step is to determine the set of parameters to be used for the WFD session. This is known as the WFD Capability Negotiation phase of WFD session setup. The following is a sequence of messages exchanged between the WFD source and WFD sink(s) in order to complete WFD Capability Negotiation. FIG. 3 describes the message sequence for WFD Capability Negotiation. At each step in the sequence of RTSP messages exchanged between the WFD devices described below, the recipient of an RTSP request message might respond with an RTSP response that includes an RTSP status code other than RTSP OK. Depending on the value RTSP status code, the message exchange might be retried with a different set of parameters or the WFD Capability Negotiation may be aborted.

FIG. 3 shows the following messages.

M1 Message: The WFD source device shall send an RTSP OPTIONS request message in order to determine the set of RTSP methods that the WFD sink supports. On receipt of an M1 (RTSP OPTIONS) request message from the WFD source, the WFD sink shall respond with an M1 (RTSP OPTIONS) response message that lists the RTSP methods supported at the WFD sink and includes an RTSP OK status code.

M2 Message: After sending an M1 response message with an RTSP OK status code to the WFD source, the WFD sink device shall send an RTSP OPTIONS request message in order to determine the set of RTSP methods that the WFD source supports. On receipt of an M2 (RTSP OPTIONS) request message from the WFD sink, the WFD source shall respond with an M2 (RTSP OPTIONS) response message that lists the RTSP methods supported at the WFD source and includes an RTSP OK status code.

M3 Messages:

M3 request: After sending an M2 response message with an RTSP OK status code to the WFD sink, the WFD source Device shall send an RTSP GET_PARAMETER request message (M3 request), explicitly specifying the list of WFD capabilities that are of interest to the WFD source.

M3 response: The WFD sink shall respond with an RTSP GET_PARAMETER response message (M3 response). The M3 response message contains an RTSP status code. If the RTSP status code is OK, the M3 response message also includes response parameters to each of the parameter specified in the M3 request message that the WFD Sink supports. The WFD sink shall ignore parameters in the M3 request message that it does not support.

M4 Messages:

M4 request: Based on the M3 response, the WFD source determines the optimal set of parameters to be used for the WFD session and shall send an RTSP SET_PARAMETER request message containing the parameter set to be used in the WFD session between the WFD source and WFD sink.

The M4 request message shall include the wfd-presentation-url that describes the Universal Resource Identifier (URI) to be used in the RTSP Setup request (M6) in order to setup the WFD session. The wfd-presentation-url specifies the URI that a WFD sink shall use in an M6 request message to a WFD source. The wfd-url0 and wfd-url1 values specified in this parameter correspond to the values of rtp-port0 and rtp-port1 values in the wfd-client-rtp-ports in the M4 request message from the WFD source to the WFD sink at the end of the Capability Negotiation phase.

M4 response: On receipt of the M4 request from the WFD source, the WFD sink shall respond with an M4 response with an RTSP status code indicating if setting the parameters as specified in M4 request was successful or not.

Further details of the WFD protocol, e.g. subsequent messages M6 to M15, are described in the Wi-Fi Display Specification [1].

In an embodiment of the wireless docking system, where the host now uses the second host address as IP address, the host processor is arranged for connecting to the audio/video peripheral according to a predefined protocol of control data packets, the control data packets in the protocol comprising a sequence of request data packets and response data packets that have to be exchanged to subsequently enable exchanging content data packets, e.g. the WFD protocol as discussed with reference to FIG. 3. The host processor is arranged for including, in the sequence, additional data packets. The additional data packets cause the audio/video peripheral to stay coupled to the host, while there is no dockee that is using the audio/video peripheral, for example before the docking session has started. This is usually called keeping the connection alive. Detailed examples of such protocol are described below.

Optionally for keeping the connection alive, the host processor is arranged for repeating, as the additional control data packets, selected request data packets from the protocol. Detailed examples of such protocol are described below.

Optionally for keeping the connection alive, the host processor is arranged for using an increasing sequence number while generating subsequent control data packets during said coupling, and transferring the actual sequence number to the dockee when starting to relay the data packets via the host. Also, the dockee processor is arranged for receiving the actual sequence number from the host when starting to exchange data packets with the audio/video peripheral, and using and further increasing the actual sequence number while generating subsequent data packets during said exchanging data packets with the audio/video peripheral. Detailed examples of such protocol are described below.

In an embodiment of the wireless docking system, the host processor is arranged for receiving, during relaying the data packets, a teardown control data packet from the dockee indicating that the dockee is terminating the use of the audio/video peripheral, transmitting a teardown response control data packet to the dockee while not relaying the teardown control data packet to the audio/video peripheral. Subsequently, to keep the connection alive, the host processor may start transmitting (further) additional data packets to the audio/video peripheral. The additional data packets cause the audio/video peripheral to stay coupled to the host. For example, the host processor is arranged for repeating, as the additional data packets, selected request data packets from the protocol that enable redefining audio/video settings of the audio/video peripheral. Detailed examples of such protocol request data packets are described below.

In a practical legacy system the following problems may occur, when the wireless docking center wants to make a Wi-Fi Display or Miracast or Wi-Fi Direct Services Display service Sink device (audio/video peripheral) available to a wireless dockee by relaying all data packets. When the audio/video peripheral is paired with the wireless docking center in the set-up phase, the audio/video peripheral comes to know the MAC address and the IP address of the wireless docking center.

In the seven-layer OSI model of computer networking, media access control (MAC) data communication protocol is a sublayer of the data link layer (layer 2). The MAC sublayer provides addressing and channel access control mechanisms that make it possible for several terminals or network nodes to communicate within a multiple access network that incorporates a shared medium, e.g. Ethernet.

The IP address of the wireless docking center may be set by either the wireless docking center itself or the audio/video peripheral, whichever device runs the DHCP service for the link between them (usually the Group Owner in case of Wi-Fi Direct or the AP in case of Infrastructure mode). The Dynamic Host Configuration Protocol (DHCP) is a standardized network protocol used on Internet Protocol (IP) networks for dynamically distributing network configuration parameters, such as IP addresses for interfaces and services. With DHCP, computers request IP addresses and networking parameters automatically from a DHCP server, reducing the need for a network administrator or a user to configure these settings manually.

The MAC address of the wireless docking center is usually constant over the life of the wireless docking center. The packets exchanged between the wireless docking center and the audio/video peripheral are the following:

RTP packets on UDP/IP for the audio/video data
RTSP packets on TCP/IP for the Wi-Fi Display session control
MAC packets on layer 2 for exchanging clock and timing information between Miracast/Wi-Fi Direct source and sink (e.g. using IEEE 802.1AS [2]).

The User Datagram Protocol (UDP) and Transmission Control Protocol (TCP) are core protocols of the Internet protocol suite (IP). TCP is so common that the entire suite is often called TCP/IP. RTSP (Real Time Streaming Protocol) is a network control protocol designed for use in entertainment and communications systems to control streaming media servers. The protocol is used for establishing and controlling media sessions between end points. Clients of media servers issue VCR-style commands, such as play and pause, to facilitate real-time control of playback of media files from the server. The transmission of streaming data itself is not a task of the RTSP protocol. Most RTSP servers use the Real-time Transport Protocol (RTP) in conjunction with Real-time Control Protocol (RTCP) for media stream delivery. The primary function of RTCP is to provide feedback on the quality of service (QoS) in media distribution by periodically sending statistics information to participants in a streaming multimedia session. RTCP may or may not be used by a server.

The legacy wireless docking center can relay all of these packets to and from the dockee. That would mean that the Wi-Fi Display part of the dockee does not see the MAC and IP address of the Wi-Fi Display sink, but those of the wireless docking center. Similarly, the Wi-Fi Display sink sees the addresses of the host.

The data rates for the RTSP packets and the MAC packets for exchanging clock and timing information are rather low, so that is not a problem, but this is a problem for the RTP packets, which contain the audio/video data.

This is because these are IP packets. For each IP packet received, the IP software stack has to take it out of the encompassing MAC packet, inspect it, change the destination IP address of all IP packets in the MAC packet, repack the IP packets in MAC packets change the MAC destination address and send it to its (relayed) destination. This is usually done in software on a processor and requires much effort.

In an embodiment much less effort would be required if packets could be relayed when they would already have the IP address in them of the destination and even less effort when also the MAC destination address would be the one of the destination. The problem is that a legacy the audio/video peripheral like a Wi-Fi Display or Miracast or Wi-Fi Direct Services Display service Sink device usually assumes that the MAC and IP address of its counterpart will remain constant after setting up a Wi-Fi Link, that the IP address for RTP and RTSP will be the same and that the same MAC address is used for the MAC, RTSP/TCP/IP and RTP/UDP/IP packets.

In a practical embodiment the wireless docking center has an IP address for itself and in addition a special IP address that it uses when pairing with a legacy audio/video peripheral like a Wi-Fi Display or Miracast or Wi-Fi Direct Services Display service Sink device. The special IP address is given to the dockee when the dockee docks and is taken back by the wireless docking center when the dockee undocks. Additionally, the wireless docking center may provide the IP address as well as the MAC address of the audio/video peripheral to the dockee when it docks, to be used for the Wi-Fi Display source component of the dockee for setting up a Wi-Fi Display session with the legacy Wi-Fi Display or Miracast or Wi-Fi Direct Services Display service Sink device.

The wireless docking center uses a normal IP address, which is generated in the normal way for almost all of its communications. When the wireless docking center is paired with a Miracast sink device and the wireless docking center runs the DHPC server for this link, the wireless docking center will generate a special IP address for itself and let the Miracast sink know about that. In case the Miracast sink runs the DHCP server for this link, the wireless docking center receives an IP address from the Miracast sink and the wireless docking center treats this as the special IP address.

During pairing, the Miracast sink device also learns the MAC address of the wireless dockee. The Miracast device will use this MAC address and the special IP address for all its Wi-Fi Display communication with the wireless docking center (RTP, RTSP and MAC timing). When the Wi-Fi link has been set-up, the Miracast sink device, as specified by the Wi-Fi Display specification, will start a TCP connection with the wireless docking center as the TCP server.

Optionally, the wireless docking center may run a Wi-Fi Direct group as a Group Owner (GO). It will then also be the DHCP server for this group. When a dockee docks, it wants to join this Wi-Fi Direct group as a client. The wireless docking center's DHCP server will assign the special IP address to the dockee.

The dockee can learn about all the peripherals that the wireless docking center can make available by pre-association discovery and by post-association discovery, so it can also learn about the Miracast sink. When the dockee lets the wireless docking center know that it wants to use the Miracast sink, the wireless docking center sends the dockee the MAC address and the IP address of the Miracast sink.

That means that all packets (MAC timing, RTP/UDP/IP and RTSP/TCP/IP) of the Miracast session from the dockee can be relayed to the Miracast sink by the wireless docking center by level 2 forwarding, which is very efficient and can be done in hardware.

Additionally, the wireless docking center can also transfer the state of its TCP server (which has a connection with the Miracast sink device) to the dockee, so that the dockee can take over this TCP connection as TCP server with the Miracast sink device in a seamless manner and fully transparent to the Miracast sink device.

All packets (MAC timing, RTP/UDP/IP and RTSP/TCP/IP) of the Miracast session from the Miracast sink will contain the IP address of the dockee, but the MAC address of the wireless docking center. For relaying, these MAC packets have to be sent to the dockee by only changing the destination MAC address.

In the Wi-Fi Display Protocol a sequence of protocol messages is used to establish the capabilities and settings of an audio/video peripheral. Details are provided in the Wi-Fi Display Technical Specification version 1.1, in particular in Chapter 4. In the embodiments below the various protocol messages are indicated by labels M1 to M15, which are further defined in said Chapter 4. The WDC establishes a link with the Wi-Fi Display Sink device connected to the WDC and executes (a subset of) the protocol sequence. When a WD docks with the WDC, it is important that the WD can configure the Wi-Fi Display Sink device to match its needs (e.g. different resolution than chosen by the WDC). The Wi-Fi Display protocol has some provisions for that, but it also has some restrictions on using M4 RTSP SET_PARAMETER request during WFD Session Management (so during video rendering and pause). This is described in section 4.10.3.2 "Explicit AV format change" of the Wi-Fi Display technical specification [1]. Such a control data packet is used in a RTSP message exchange which is called WFD Capability Re-negotiation. For example, depending on a certain bit, the video frame rate of a 3D format may only be changed with user intervention or automatically without user intervention. This bit is the Video Frame Rate Change Support bit (B4) of the frame-rate-control-support field in the wfd-video-formats parameter or the wfd-3d-formats parameter, which wfd parameters are further described in [1].

There are further rules for automatic AV format change(s) using the M4 RTSP SET_PARAMETER request message. Other changes may lead to discontinuity of the video rendering. For example, during a WFD Session, the video codec profile in use shall not be changed in an RTSP M4 request message or in an MPEG2-TS. During a WFD Session, a WFD Source (in our case the WD) may change H.264 Level in use by indicating this change in an RTSP M4 request message or in an MPEG2-TS. However, changing H.264 level from a lower level to a higher level during a WFD Session may cause a decoder reset at the WFD Sink and may result a discontinuity of video rendering. To avoid such discontinuities, it is recommended that the WFD Source (in our case the original WFD Source, i.e. the WDC) sets the highest H.264 level that is supported by both the WFD Source and the WFD Sink. During a WFD Session, the scan method of video, i.e., progressive or interlace shall not be changed in an RTSP M4 request message or in an MPEG2-TS. When changing video format, i.e., resolution or refresh rate, the WFD Source (in our case the WD) shall transmit an IDR picture just after changing video format(s), to reset parameters, as specified in [1]. It should be noted that transmission of an IDR picture may require higher instantaneous peak throughput even if the resolution and/or refresh rate after change is lower than the previous values.

If the WFD Sink supports a refresh rate change, as indicated in the Refresh rate change support field in the wfd-video-formats parameter (specified in section 6.1.3) or in the wfd-3d-formats parameter (specified in section 6.1.4), the WFD Source may change video refresh rate among supported video refresh rates indicated by the WFD Sink. During a WFD Session, video resolution and refresh rate shall not be changed simultaneously in an RTSP M4 request message or in an MPEG2-TS.

During a WFD Session, audio format (i.e., sample rate, bits per sample, the number of channels, audio codec) shall not be changed in an RTSP M4 request message or in an MPEG2-TS.

To cope with such rules and restrictions the following embodiments are proposed as possible implementations of Wi-Fi Display relay in a WDC. These implementations are based on variations in implementation of Wi-Fi Display Sink devices that do not cause a Wi-Fi Display Sink device to fail Wi-Fi Display certification.

Optionally, more than one possibility may be implemented. If so, the WDC may try and find out with or without user intervention which methods are supported by a Wi-Fi Display Sink device after that Wi-Fi Display Sink device has been paired with the WDC. Trying an implementation option and finding out that it does not work with the Wi-Fi Display Sink device that is being paired may involve tearing down the P2P Group and starting all over again from pre-association discovery. The user may have to perform actions to pair the devices again (e.g. entering a PIN code, pushing a button to accept a connection request or Wi-Fi Display session request, etc.).

The WDC may be the P2P GO within the P2P Group established between the WDC and the Wi-Fi Display Sink device. The WD may become part of the same P2P group as the Wi-Fi Display Sink device once the WD gets docked with the WDC. Other topologies may also be possible, e.g. the WDC and the WD could be part of a P2P Group, with either one of these being the P2P GO and the WDC and the Wi-Fi Sink may be part of another P2P group with either one being the P2P GO as long as the WD and WDC support the IP address reconfiguration and MAC adaptations as described in this document.

The Wi-Fi Display specification requires Wi-Fi Display protocol steps to be executed within a certain maximum time between the consecutive steps (e.g. as specified in Section 6.5 and 6.5.2 of [1]), typically all the way from P2P connection setup to an M7 message to start playback. Implementations five and six as specified below can adhere to this maximum time from start to M7. A Wi-Fi Display test plan may enforce several of the maximum reaction times, but not all of them. That may provide us some additional implementation possibilities, as described below.

An embodiment is called "Implementation 1 Stop after DHCP". When the WDC and the Wi-Fi Display Sink device are paired, the WDC executes the Wi-Fi Docking protocol with the Wi-Fi Display Sink device, but stops after the DHCP step. When a WD is docked and when the WD wants to use the Wi-Fi Display Sink device using Wi-Fi Display relay, the WDC employs the IP address and MAC address substitution as described above and lets the WD execute the Wi-Fi Display protocol starting with M1 RTSP OPTIONS request from the WD through the WDC to the Wi-Fi Display Sink device. The WDC forwards any RTSP message from the WD to Wi-Fi Display Sink device and vice versa, with the exception of the M8 RTSP TEARDOWN request, as described later.

The WDC or its user should try and detect whether the Wi-Fi Display Sink device remains waiting indefinitely for the next step of the Wi-Fi Display protocol, or times out in order to determine whether this implementation option works with the Wi-Fi Display Sink device.

An embodiment is called "Implementation 2" and intends to stop after the M2 RTSP OPTIONS response. When the WDC and the Wi-Fi Display Sink device are paired, the WDC executes the Wi-Fi Docking protocol with the Wi-Fi Display Sink device, but stops after the M2 RTSP OPTIONS response message. The WDC only sends the mandatory items in its M1 RTSP OPTIONS request message to the Wi-Fi Display Sink device, i.e. OPTIONS * RTSP/1.0 and Require: org.wfa.wfd1.0. The WDC only sends the mandatory items in its M2 RTSP OPTIONS response message to the Wi-Fi Display Sink device, i.e. org.wfa.wfd1.0, SET_PARAMETER, GET_PARAMETER, SETUP, PLAY, PAUSE and TEARDOWN. It is recommended for the WDC to send "dummy" packets (or repeat the M1) message in order to keep the P2P connection alive between the WDC and the Wi-Fi Display Sink device.

When a WD is docked and when the WD wants to use the Wi-Fi Display Sink device using Wi-Fi Display relay, the WDC gives the WD the special IP address it reserved for Wi-Fi Display relay and the WDC executes the Wi-Fi Display protocol with the WD up to and including the message M2 RTSP OPTIONS response. Nothing is relayed yet to the Wi-Fi Display Sink device. Then, the WDC employs the IP address and MAC address substitution as described above. The WDC may inform the WD about the Cseq number the WDC has used in its last RTSP message or that it is going to use in its last RTSP message to the Wi-Fi Display Sink device.

The WDC lets the WD execute the Wi-Fi Display protocol starting with M3 RTSP GET_PARAMETER request from the WD through the WDC to the Wi-Fi Display Sink device. The WD may use an increasing sequence number while generating subsequent control data packets, e.g. the Cseq number, which is received by the WD from the WDC to continue the numbering of its RTSP messages with the value that the Wi-Fi Display Sink device expects, so the Wi-Fi Display Sink device does not notice when the WDC starts relaying the RTSP messages from the WD. The WDC forwards any RTSP message from the WD to Wi-Fi Display Sink device and vice versa, with the exception of the M8 RTSP TEARDOWN request, see later. The WDC or its user should try and detect whether the Wi-Fi Display Sink device remains waiting indefinitely for the next step of the Wi-Fi Display protocol after the M2 RTSP OPTIONS response, or times out in order to determine whether this implementation option works with the Wi-Fi Display Sink device.

An embodiment is called "Implementation 3" and intends to stop after M4 RTSP SET_PARAMETER response with Wi-Fi Display Sink that does not support Explicit AV Format Change. When the WDC and the Wi-Fi Display Sink device are paired, the WDC executes the Wi-Fi Docking protocol with the Wi-Fi Display Sink device, but stops after the M4 RTSP SET_PARAMETER message. As an alternative, the WDC may continue after this message and start streaming some audio and/or video, using as source IP address the address that the WD will get when that WD wants to use the Wi-Fi Display Sink device, see "implementation 5" below.

The WDC sends the mandatory items in its M1 RTSP OPTIONS request message to the Wi-Fi Display Sink device, i.e. OPTIONS * RTSP/1.0 and Require: org.wfa.wfd1.0. Other values are not specified by the Wi-Fi Display specification. The WDC sends the mandatory items in its M2 RTSP OPTIONS response message to the Wi-Fi Display Sink device, i.e. org.wfa.wfd1.0, SET_PARAMETER, GET_PARAMETER, SETUP, PLAY, PAUSE and TEARDOWN. Other values, such as e.g. Record, are not allowed by the Wi-Fi Display specification. The WDC may specify the list of WFD capabilities, such as e.g. audio codecs supported, video formats supported, content protection (HDCP) supported, see section 6.1 of the Wi-Fi Display specification, that are of interest to the WDC in the M3 RTSP GET_PARAMETER request that the WDC sends to the Wi-Fi Display Sink device. Alternatively, the WDC may simply request all possible capabilities defined by the Wi-Fi Display specification. The WDC stores the returned capabilities and their values for later use when a WD is docked and wants to use the Wi-Fi Display Sink device using Wi-Fi Display relay.

The WDC sets the parameters for the capabilities, which the Wi-Fi Display Sink device indicated support for, to values that the WDC is certain of that all or at least many WDs will support using the M4 RTSP SET_PARAMETER request message. These values may be default values for a Wi-Fi Display Source or Wi-Fi Peer to Peer Services Display service or values that are mandatory to support for a Wi-Fi Display Source or Wi-Fi Peer to Peer Services Display service as specified in an appropriate specification. One of the parameters that the WDC has to send to the Wi-Fi Display Sink device using the M4 RTSP SET_PARAMETER request message is the wfd_presentation_URL, i.e. the RTSP port that the WDC and later on the WD when it is docked will listen to. This parameter cannot be changed anymore by the WD without tearing down the whole Wi-Fi Display session completely.

Since the WDC halts execution of the Wi-Fi Display protocol after M4, It is recommended for the WDC to send "dummy" packets (or repeat the M1) message in order to keep the P2P connection alive between the WDC and the Wi-Fi Display Sink device. At this point in the amended protocol a restart may commence.

When a WD is docked and when the WD wants to use the Wi-Fi Display Sink device using Wi-Fi Display relay, the WDC gives the WD the special IP address it reserved for Wi-Fi Display relay and the WDC executes the Wi-Fi Display with the WD up to and including the message M4 RTSP SET_PARAMETER response. Nothing is relayed yet to the Wi-Fi Display Sink device. The capabilities that the WDC will send to the WD in the M3 RTSP GET_PARAMETER response are the capabilities that the WDC has set in the Wi-Fi Display Sink device with the M4 RTSP SET_PARAMETER request message. Then, the WDC employs the IP address and MAC address substitution as described above.

The WDC may inform the WD about
  the wfd_presentation_URL that the Wi-Fi Display Sink device will use, which value the WDC has already sent to the Wi-Fi Display Sink device and which the WD has to use as a Wi-Fi Display Source device using the relayed Wi-Fi Display service, and
  the Cseq number the WDC has used in its last RTSP message to the Wi-Fi Display Sink device.

Informing the above may be done as part of the reply of the WDC to the WD to the message of the WD to the WDC in which the WD informs the WDC that it wants to use the Wi-Fi Display Sink device using relay.

The WDC lets the WD execute the Wi-Fi Display protocol continuing with the WFD Session establishment and streaming audio and/or video content from WD through WDC to the Wi-Fi Display Sink device. The WD uses the Cseq number it received from the WDC to continue the numbering of its RTSP messages with the value that the Wi-Fi Display Sink device expects, so the Wi-Fi Display Sink device does not notice when the WDC starts relaying the RTSP messages from the WD. The WDC forwards any RTSP message from the WD to Wi-Fi Display Sink device and vice versa, with the exception of the M8 RTSP TEARDOWN request, see later.

In setting up the Wi-Fi Display Sink device with the WDC, the WDC or its user may try and detect whether the Wi-Fi Display Sink device remains waiting indefinitely for the next step of the Wi-Fi Display protocol after the first M4 RTSP SET_PARAMETER response, or times out.

An embodiment is called "Implementation 4" and intends to stop after M4 RTSP SET_PARAMETER response with Wi-Fi Display Sink that does support Explicit AV Format Change. When the WDC and the Wi-Fi Display Sink device are paired, the WDC executes the Wi-Fi Docking protocol with the Wi-Fi Display Sink device, but stops after the M4 RTSP SET_PARAMETER message. As an alternative, the WDC may continue after this message and start streaming some audio and/or video, using as source IP address the address that the WD will get when that WD wants to use the Wi-Fi Display Sink device, see implementation 6 below.

The WDC sends the mandatory items in its M1 RTSP OPTIONS request message to the Wi-Fi Display Sink device, i.e. OPTIONS * RTSP/1.0 and Require: org.wfa.wfd1.0. Other values are not allowed by the Wi-Fi Display specification. The WDC sends the mandatory items in its M2 RTSP OPTIONS response message to the Wi-Fi Display Sink device, i.e. org.wfa.wfd1.0, SET_PARAMETER, GET_PARAMETER, SETUP, PLAY, PAUSE and TEARDOWN. Other values, such as e.g. Record, are not allowed by the Wi-Fi Display specification. The WDC specifies the list of WFD capabilities, such as e.g. audio codecs supported, video formats supported, content protection (HDCP) supported, see section 6.1 of the Wi-Fi Display specification, that are of interest to the WDC in the M3 RTSP GET_PARAMETER request that the WDC sends to the Wi-Fi Display Sink device. Alternatively, the WDC may simply request all possible capabilities defined by the Wi-Fi Display specification. The WDC stores the returned capabilities and their values for later use when a WD is docked and wants to use the Wi-Fi Display Sink device using Wi-Fi Display relay.

The WDC sets the parameters for the video capabilities (frame rate, frame size, progressive/interlaced) to the best values for which the Wi-Fi Display Sink device indicated support. Setting the best possible values at this point ensures the least probability of discontinuities in video rendering, see section 4.10.3.2 "Explicit AV format change" of the Wi-Fi Display technical specification, when the WD later on in the sets lower values in WFD Capability Re-negotiation using M4 RTSP SET_PARAMETER request messages in the Wi-Fi Display Session Management phase. The WDC sets the parameters for the other capabilities, which the Wi-Fi Display Sink device indicated support for, to values that the WDC is certain of that all or at least many WDs will support. These values may be default values for a Wi-Fi Display Source or Wi-Fi Peer to Peer Services Display service or values that are mandatory to support for a Wi-Fi Display Source or Wi-Fi Peer to Peer Services Display service as specified in an appropriate specification.

One of the parameters that the WDC has to send to the Wi-Fi Display Sink device using the M4 RTSP SET_PARAMETER request message is the wfd_presentation_URL, i.e. the RTSP port that the WDC and later on the WD when it is docked will listen to. This parameter cannot be changed anymore by the WD without tearing down the whole Wi-Fi Display session completely. The WDC sets the above two sets of parameters for capabilities using the M4 RTSP SET_PARAMETER request message. At this point in the amended protocol a restart may commence.

Since it halts execution of the Wi-Fi Display protocol after M4, It is recommended for the WDC to send "dummy" packets (or repeat the M1) message in order to keep the P2P connection alive between the WDC and the Wi-Fi Display Sink device. When a WD is docked and when the WD wants to use the Wi-Fi Display Sink device using Wi-Fi Display relay, the WDC gives the WD the special IP address it reserved for Wi-Fi Display relay and the WDC executes the Wi-Fi Display with the WD up to and including the message M3 RTSP GET_PARAMETER response. Nothing is relayed yet to the Wi-Fi Display Sink device.

The video capabilities that the WDC will send to the WD in the M3 RTSP GET_PARAMETER response are the capabilities that the WDC has learned from the Wi-Fi Display Sink device with the M3 RTSP GET_PARAMETER response message from the Wi-Fi Display Sink device. All other capabilities that the WDC will send to the WD in the M3 RTSP GET_PARAMETER response are the capabilities that the WDC has Wi-Fi Display Sink device with the M4 RTSP SET_PARAMETER request message. Then, the WDC employs the IP address and MAC address substitution as described above.

The WDC informs the WD about the wfd_presentation_URL that the Wi-Fi Display Sink device uses, which value the WDC has already sent to the Wi-Fi Display Sink device and which the WD has to use as a Wi-Fi Display Source device using the relayed Wi-Fi Display service, and the Cseq number the WDC has used in its last RTSP message to the Wi-Fi Display Sink device.

Informing the above may be done as part of the reply of the WDC to the WD to the message of the WD to the WDC in which the WD informs the WDC that it wants to use the Wi-Fi Display Sink device using relay.

The WDC lets the WD execute the Wi-Fi Display protocol continuing with the M4 RTSP SET_PARAMETER request message from WD through WDC to the Wi-Fi Display Sink device. The WD uses the Cseq number it received from the WDC to continue the numbering of its RTSP messages with the value that the Wi-Fi Display Sink device expects, so the Wi-Fi Display Sink device does not notice when the WDC starts relaying the RTSP messages from the WD.

The WDC forwards any RTSP message from the WD to Wi-Fi Display Sink device and vice versa, with the exception of the M8 RTSP TEARDOWN request, see later. The WD can set the video parameters it wants to use up to the maximum that the Wi-Fi Display Sink device has indicated. The Wi-Fi Display Sink device will treat this as a WFD Capability Re-negotiation and hence, the WD will have to include the wfd-av-format-change-timing parameter with the appropriate timing.

Optionally, because some implementations of Wi-Fi Display Sink devices may not allow sending 2 M4 RTSP SET_PARAMETER request message after another in this phase (the first came from the WDC itself when the WD was not docked yet and the second came from the WD and was relayed by the WDC), as an alternative, the WD initially uses the best values it learned from the WDC in the M3 RTSP GET_PARAMETER response for video streaming, skips M4, continues with the Wi-Fi Docking protocol until it is in the WFD Session Management phase and only then sets the video parameters it really wants using a WFD Capability Re-negotiation with the M4 RTSP SET_PARAMETER request message.

In setting up the Wi-Fi Display Sink device with the WDC, the WDC or its user should try and detect whether the Wi-Fi Display Sink device remains waiting indefinitely for the next step of the Wi-Fi Display protocol after the first M4 RTSP SET_PARAMETER response, or times out.

An embodiment is called "Implementation 5" and intends to stop after M7 RTSP PLAY response with Wi-Fi Display Sink that does not support Explicit AV Format Change. When the WDC and the Wi-Fi Display Sink device are paired, the WDC executes the Wi-Fi Docking protocol with the Wi-Fi Display Sink device, but stops after the M7 RTSP PLAY response message.

The WDC sends the mandatory items in its M1 RTSP OPTIONS request message to the Wi-Fi Display Sink device, i.e. OPTIONS * RTSP/1.0 and Require: org.wfa.wfd1.0. Other values are not allowed by the Wi-Fi Display specification. The WDC sends the mandatory items in its M2 RTSP OPTIONS response message to the Wi-Fi Display Sink device, i.e. org.wfa.wfd1.0, SET_PARAMETER, GET_PARAMETER, SETUP, PLAY, PAUSE and TEARDOWN. Other values, such as e.g. Record, are not allowed by the Wi-Fi Display specification.

The WDC specifies the list of WFD capabilities, such as e.g. audio codecs supported, video formats supported, content protection (HDCP) supported, see section 6.1 of the Wi-Fi Display specification, that are of interest to the WDC in the M3 RTSP GET_PARAMETER request that the WDC sends to the Wi-Fi Display Sink device. Alternatively, the WDC may simply request all possible capabilities defined by the Wi-Fi Display specification. The WDC stores the returned capabilities and their values for later use when a WD is docked and wants to use the Wi-Fi Display Sink device using Wi-Fi Display relay.

The WDC sets the parameters for the capabilities, which the Wi-Fi Display Sink device indicated support for, to values that the WDC is certain of that all or at least many WDs will support using the M4 RTSP SET_PARAMETER request message. These values may be default values for a Wi-Fi Display Source or Wi-Fi Peer to Peer Services Display service or values that are mandatory to support for a Wi-Fi Display Source or Wi-Fi Peer to Peer Services Display service as specified in an appropriate specification. One of the parameters that the WDC has to send to the Wi-Fi Display Sink device using the M4 RTSP SET_PARAMETER request message is the wfd_presentation_URL, i.e. the RTSP port that the WDC and later on the WD when it is docked will listen to. This parameter cannot be changed anymore by the WD without tearing down the whole Wi-Fi Display session completely.

The WDC sends a M5 RTSP Trigger SETUP request to the Wi-Fi Display Sink device. The latter responds with the M5 RTSP Trigger SETUP response and after that a M6 RTSP SETUP request message containing the Wi-Fi Display presentation URL and the RTP port of the Wi-Fi Display Sink device.

The WDC stores the Wi-Fi Display presentation URL and the RTP port of the Wi-Fi Display Sink device and replies with a M6 RTSP SETUP response with Result Code OK, the Session ID that the Wi-Fi Display Sink device will use, the RTP port that the Wi-Fi Display Sink device will use.

At this point in the amended protocol a restart may commence.

The WDC sends a M5 RTSP Trigger PLAY request to the Wi-Fi Display Sink device and the latter responds with an M5 RTSP Trigger PLAY response message followed by an M7 RTSP PLAY request. The WDC replies with an M7 RTSP PLAY response with Result Code OK and start streaming some video and/or audio in the correct format. This may e.g. be a short, repeating, prerecorded stream. The stream may e.g. explain that the WDC is waiting for a WD to dock. The stream may also show a UI of the WDC, etc.

When a WD is docked and when the WD wants to use the Wi-Fi Display Sink device using Wi-Fi Display relay, the WDC gives the WD the special IP address it reserved for Wi-Fi Display relay.

The WDC informs the WD about the wfd_presentation_URL that the Wi-Fi Display Sink device uses, Session ID that the Wi-Fi Display Sink device uses and the IP port that the Wi-Fi Display Sink device uses, which three values the WDC has already sent to the Wi-Fi Display Sink device and which the WD has to use as a Wi-Fi Display Source device using the relayed Wi-Fi Display service, and the Cseq number the WDC has used in its last RTSP message or that it is going to use in its last RTSP message to the Wi-Fi Display Sink device.

Informing the above may be done as part of the reply of the WDC to the WD to the message of the WD to the WDC in which the WD informs the WDC that it wants to use the Wi-Fi Display Sink device using relay.

The WDC then executes the Wi-Fi Display protocol with the WD up to and including the message M5 RTSP Trigger PLAY response. Nothing is relayed yet to the Wi-Fi Display Sink device.

The capabilities that the WDC will send to the WD in the M3 RTSP GET_PARAMETER response are the capabilities that the WDC has set in the Wi-Fi Display Sink device with the M4 RTSP SET_PARAMETER request message.

The WD will simply have to set these values using the M4 RTSP SET_PARAMETER request because it has not received any other options from the WDC.

The WDC will forward the Wi-Fi Display presentation URL and the RTP port of the Wi-Fi Display Sink device in the M6 RTSP SETUP request message the WDC will send to the WD.

The WD will send the Session ID and RTP port it was instructed to use by the WDC to the WDC using the M6 RTSP SETUP response.

In parallel with the above message exchange between WD and WDC when the WD has indicated that it wants to use the Wi-Fi Display Sink device using Wi-Fi Display relay, the WDC has the following message exchange with the Wi-Fi Display Sink device.

The WDC sends a M5 RTSP Trigger PAUSE request to the Wi-Fi Display Sink device. The latter responds with a M5 RTSP Trigger PAUSE response followed by a M9 RTSP PAUSE request message to the WDC. The WDC uses the Cseq number of these messages to inform the WD about the last Cseq number used.

The WDC stops streaming to the Wi-Fi Peripheral

The above requested pause in streaming may or may not be necessary for a good change over from the WDC as an RTP source to the WD as an RTP source. E.g. the timing values (time stamps) in the mpeg2 transport stream (e.g. PCR, DTS, PTS) as well as the RTP time stamps will be very different from the two and the decoder in the Wi-Fi Display Sink device may handle a timing jump better when the stream is first paused.

When the above two parallel message exchanges have been completed, the WDC employs the IP address and MAC address substitution as described above and lets the WD execute the Wi-Fi Display protocol continuing with the M5 RTSP Trigger PLAY request through WDC to the Wi-Fi Display Sink device.

The WD uses the Cseq number it received from the WDC to continue the numbering of its RTSP messages with the value that the Wi-Fi Display Sink device expects, so the Wi-Fi Display Sink device does not notice when the WDC starts relaying the RTSP messages from the WD. The WDC forwards any RTSP message from the WD to Wi-Fi Display Sink device and vice versa, with the exception of the M8 RTSP TEARDOWN request, see later.

An embodiment is called "Implementation 6" and intends to stop after M7 RTSP PLAY response with Wi-Fi Display Sink that does support Explicit AV Format Change. When the WDC and the Wi-Fi Display Sink device are paired, the WDC executes the Wi-Fi Docking protocol with the Wi-Fi Display Sink device, but stops after the M7 RTSP PLAY response message.

The WDC sends the mandatory items in its M1 RTSP OPTIONS request message to the Wi-Fi Display Sink device, i.e. OPTIONS * RTSP/1.0 and Require: org.w-fa.wfd1.0. Other values are not allowed by the Wi-Fi Display specification. The WDC sends the mandatory items in its M2 RTSP OPTIONS response message to the Wi-Fi Display Sink device, i.e. org.wfa.wfd1.0, SET_PARAMETER, GET_PARAMETER, SETUP, PLAY, PAUSE and TEARDOWN. Other values, such as e.g. Record, are not allowed by the Wi-Fi Display specification.

The WDC specifies the list of WFD capabilities, such as e.g. audio codecs supported, video formats supported, content protection (HDCP) supported, see section 6.1 of the Wi-Fi Display specification, that are of interest to the WDC in the M3 RTSP GET_PARAMETER request that the WDC sends to the Wi-Fi Display Sink device. Alternatively, the WDC may simply request all possible capabilities defined by the Wi-Fi Display specification. The WDC stores the returned capabilities and their values for later use when a WD is docked and wants to use the Wi-Fi Display Sink device using Wi-Fi Display relay.

The WDC sets the parameters for the video capabilities (frame rate, frame size, progressive/interlaced) to the best values for which the Wi-Fi Display Sink device indicated support. Setting the best possible values at this point ensures the least probability of discontinuities in video rendering, see section 4.10.3.2 "Explicit AV format change" of the Wi-Fi Display technical specification, when the WD later on in the sets lower values in WFD Capability Re-negotiation using M4 RTSP SET_PARAMETER request messages in the Wi-Fi Display Session Management phase.

The WDC sets the parameters for the other capabilities, which the Wi-Fi Display Sink device indicated support for, to values that the WDC is certain of that all or at least many WDs will support. These values may be default values for a Wi-Fi Display Source or Wi-Fi Peer to Peer Services Display service or values that are mandatory to support for a Wi-Fi Display Source or Wi-Fi Peer to Peer Services Display service as specified in an appropriate specification.

One of the parameters that the WDC has to send to the Wi-Fi Display Sink device using the M4 RTSP SET_PARAMETER request message is the wfd_presentation_URL, i.e. the RTSP port that the WDC and later on the WD when it is docked will listen to. This parameter cannot be changed anymore by the WD without tearing down the whole Wi-Fi Display session completely.

The WDC sets the above two sets of parameters for capabilities using the M4 RTSP SET_PARAMETER request message. The WDC sends a M5 RTSP Trigger SETUP request to the Wi-Fi Display Sink device. The latter responds with the M5 RTSP Trigger SETUP response and after that a M6 RTSP SETUP request message containing the Wi-Fi Display presentation URL and the RTP port of the Wi-Fi Display Sink device.

The WDC stores the Wi-Fi Display presentation URL and the RTP port of the Wi-Fi Display Sink device and replies with a M6 RTSP SETUP response with Result Code OK, the Session ID that the Wi-Fi Display Sink device will use, the RTP port that the Wi-Fi Display Sink device will use.

At this point in the amended protocol a restart may commence.

The WDC sends a M5 RTSP Trigger PLAY request to the Wi-Fi Display Sink device and the latter responds with an M5 RTSP Trigger PLAY response message followed by an M7 RTSP PLAY request. The WDC replies with an M7 RTSP PLAY response with Result Code OK and start streaming some video and/or audio in the correct format. This may e.g. be a short, repeating, prerecorded stream. The stream may e.g. explain that the WDC is waiting for a WD to dock. The stream may also show a UI of the WDC, etc. When a WD is docked and when the WD wants to use the Wi-Fi Display Sink device using Wi-Fi Display relay, the WDC gives the WD the special IP address it reserved for Wi-Fi Display relay.

The WDC informs the WD about the wfd_presentation_URL that the Wi-Fi Display Sink device uses, Session ID that the Wi-Fi Display Sink device uses and the IP port that the Wi-Fi Display Sink device uses, which values the WDC has already sent to the Wi-Fi Display Sink device and which the WD has to use as a Wi-Fi Display Source device using the relayed Wi-Fi Display service, and the Cseq number the WDC has used in its last RTSP message or that it is going to use in its last RTSP message to the Wi-Fi Display Sink device.

Informing the above may be done as part of the reply of the WDC to the WD to the message of the WD to the WDC in which the WD informs the WDC that it wants to use the Wi-Fi Display Sink device using relay.

The WDC then executes the Wi-Fi Display protocol with the WD up to and including the message M5 RTSP Trigger PLAY response. Nothing is relayed yet to the Wi-Fi Display Sink device.

The capabilities that the WDC will send to the WD in the M3 RTSP GET_PARAMETER response are the capabilities that the WDC has learned from the Wi-Fi Display Sink device with the M4 RTSP SET_PARAMETER request message.

The WD will simply have to set these values using the M4 RTSP SET_PARAMETER request because it has not received any other options from the WDC.

The WDC will forward the Wi-Fi Display presentation URL and the RTP port of the Wi-Fi Display Sink device in the M6 RTSP SETUP request message the WDC will send to the WD.

The WD will send the Session ID and RTP port it was instructed to use by the WDC to the WDC using the M6 RTSP SETUP response.

In parallel with the above message exchange between WD and WDC when the WD has indicated that it wants to use the Wi-Fi Display Sink device using Wi-Fi Display relay, the WDC has the following message exchange with the Wi-Fi Display Sink device.

The WDC sends a M5 RTSP Trigger PAUSE request to the Wi-Fi Display Sink device. The latter responds with a M5 RTSP Trigger PAUSE response followed by a M9 RTSP PAUSE request message to the WDC. The WDC uses the Cseq number of these messages to inform the WD about the last Cseq number used.

The WDC stops streaming to the Wi-Fi Peripheral

The requested pause in streaming may be necessary for a good change over from the WDC as an RTP source to the WD as an RTP source. For example, the timing values (time stamps) in the mpeg2 transport stream (e.g. PCR, DTS, PTS) as well as the RTP time stamps will be very different from the two and the decoder in the Wi-Fi Display Sink device may handle a timing jump better when the stream is first paused.

When the above two parallel message exchanges have been completed, the WDC employs the IP address and MAC address substitution as described above and lets the WD execute the Wi-Fi Display protocol continuing with the M5 RTSP Trigger PLAY request through WDC to the Wi-Fi Display Sink device. The WDC forwards any RTSP message from the WD to Wi-Fi Display Sink device and vice versa, with the exception of the M8 RTSP TEARDOWN request, see later.

The WD uses the Cseq number it received from the WDC to continue the numbering of its RTSP messages with the value that the Wi-Fi Display Sink device expects, so the Wi-Fi Display Sink device does not notice when the WDC start relaying the RTSP messages from the WD.

During the Wi-Fi Display Session Management phase, i.e. in the phase that video can be played or streamed, stopped or paused, the WD can set other values for some video parameters in WFD Capability Re-negotiation using M4 RTSP SET_PARAMETER request messages.

The following embodiments relate to stopping a session, i.e. terminating using the audio/video peripheral when the dockee decides that the services provided by the audio/video peripheral are no longer needed.

A first embodiment is for stopping the session in case of implementation 1 or 2. A Wi-Fi Display Sink device that is a P2P GO (Peer to Peer group Owner) may de-authenticate the WDC and tear down the P2P Group after a successful M8 RTSP TEARDOWN message exchange. However, a Wi-Fi Display Sink device that is not a GO may go into an unspecified mode after a successful M8 RTSP TEARDOWN message exchange. Therefore, the WDC should do the following.

If the WD sends a M8 RTSP TEARDOWN request, the WDC must not relay this to the Wi-Fi Display Sink device, but handle it by itself by sending a M8 RTSP TEARDOWN response to the WD.

If the Wi-Fi Display Sink device sends a M8 RTSP TEARDOWN request, the WDC must not accept it, i.e. not send a M8 RTSP TEARDOWN response with Status OK.

The WDC then tries to execute the Wi-Fi Docking protocol from the M1 RTSP OPTIONS message, when there is no WD docked, as described above for the implementations 1 or 2. However, the Wi-Fi Display Sink device implementation may be such that it does not allow this and wants to start from the initial pairing. So if the WDC does not receive an M1 RTSP OPTIONS response with Result Code OK, it should end the Wi-Fi Display Management session by sending a M5 RTSP Trigger TEARDOWN request to the Wi-Fi Display Sink device. The latter will respond with a M5 RTSP Trigger TEARDOWN response followed by a M8 RTSP TEARDOWN request to the WDC.

The WDC responds with a M8 RTSP TEARDOWN response.

If the Wi-Fi Display Sink device was the GO, the Wi-Fi Display Sink device may tear down the P2P Group. If so, the WDC and the Wi-Fi Display Sink device have to be paired again up to and including running the DHCP protocol.

If the WDC was the GO, it may maintain the P2P Group. However, it may be needed for some implementations of Wi-Fi Display Sink devices to also tear down the P2P Group and pair the WDC and Wi-Fi Display Sink device anew.

The WDC then tries to execute the Wi-Fi Docking protocol from the M1 RTSP OPTIONS message, when there is no WD docked, as described above for these implementations.

A further embodiment provides a different way of stopping the session for the case that the WD was streaming audio and/or video through the WDC by Wi-Fi Display relay to the Wi-Fi Display Sink. The WDC received indication from the WD to stop the session or has decided for some other reason to stop the session.

If the WD sends a M8 RTSP TEARDOWN request, the WDC must not relay this to the Wi-Fi Display Sink device, but handle it by itself by sending a M8 RTSP TEARDOWN response to the WD.

The WDC sends a M5 RTSP Trigger PAUSE request to the Wi-Fi Display Sink device. The latter will respond with a M5 RTSP Trigger PAUSE response followed by a M9 RTSP PAUSE request message to the WDC.

The WDC stops streaming to the Wi-Fi Peripheral if the WD has not already done so.

Optionally, the WDC may perform the following in addition to the above

The WDC sends a M5 RTSP Trigger PLAY request to the Wi-Fi Display Sink device and the latter responds with an M5 RTSP Trigger PLAY response message followed by an M7 RTSP PLAY request.

The WDC replies with an M7 RTSP PLAY response with Result Code OK and start streaming some video and/or audio in the correct format. This may e.g. be a short, repeating, prerecorded stream. The stream may e.g. explain that the WDC is waiting for a WD to dock. The stream may also show a UI of the WDC, etc.

The WDC waits for a WD to dock and indicate that this WD wants to use the Wi-Fi Display device using Wi-Fi Display relay through the WDC.

In the case that the WDC was streaming the optional audio and/or video, the WDC sends a M5 RTSP Trigger PAUSE request to the Wi-Fi Display Sink device. The latter will respond with a M5 RTSP Trigger PAUSE response followed by a M9 RTSP PAUSE request message to the WDC.

The WDC stops streaming to the Wi-Fi Peripheral.

The WDC then tries to execute the Wi-Fi Docking protocol from the M1 RTSP OPTIONS message, when there is no WD docked, as described above for these implementations. However, the Wi-Fi Display Sink device implementation may be such that it does not allow this and wants to start from the initial pairing. So if the WDC does not receive an M1 RTSP OPTIONS response with Result Code OK, it should end the Wi-Fi Display Management session by sending a M5 RTSP Trigger TEARDOWN request to the Wi-Fi Display Sink device. The latter will respond with a M5 RTSP Trigger TEARDOWN response followed by a M8 RTSP TEARDOWN request to the WDC. The WDC responds with a M8 RTSP TEARDOWN response.

If the Wi-Fi Display Sink device was the GO, the Wi-Fi Display Sink device may tear down the P2P Group. If the latter happens, the WDC and the Wi-Fi Display Sink device have to be paired again up to and including running the DHCP protocol.

If the WDC was the GO, it may maintain the P2P Group. However, it may be needed for some implementations of Wi-Fi Display Sink devices to also tear down the P2P Group and pair the WDC and Wi-Fi Display Sink device anew. The WDC then tries to execute the Wi-Fi Docking protocol from the M1 RTSP OPTIONS message, when there is no WD docked, as described above for these implementations.

A second embodiment is for stopping the session for the implementations 3 to 6. A docked WD may be stopped before the WD has streamed audio and/or video to the Wi-Fi Display Sink by relay through the WDC.

If the WD sends a M8 RTSP TEARDOWN request, the WDC must not relay this to the Wi-Fi Display Sink device, but handle it by itself by sending a M8 RTSP TEARDOWN response to the WD, so it can keep the Wi-Fi Display session alive.

In case the WDC receives a M8 RTSP TEARDOWN request from the WD or the WDC for some other reason decides to stop the docking session with the WD, the WDC stops employing the IP address and MAC address substitution as described above.

The WDC has the following message exchange with the Wi-Fi Display Sink device, possibly in parallel with the above M8 message exchange if there was one.

The WDC sends a M5 RTSP Trigger PAUSE request to the Wi-Fi Display Sink device. The latter will respond with a M5 RTSP Trigger PAUSE response followed by a M9 RTSP PAUSE request message to the WDC.

The WDC stops streaming to the Wi-Fi Peripheral if the WD has not already done so.

For implementations 4 and 6, the WDC performs a WFD Capability Re-negotiation by sending an M4 RTSP SET_PARAMETER request message containing the best values for the video capabilities for which the Wi-Fi Display Sink device indicated support.

For implementations 3 and 5, the WDC restarts the execution at the sentence "At this point in the amended protocol a restart may commence" in the description of implementation 5.

For implementations 4 and 6, the WDC restarts the execution at the sentence "At this point in the amended protocol a restart may commence" in the description of implementation 6.

Stopping the session for implementation 5 and 6 if no docked WD ever got as far as streaming audio and/or video to the Wi-Fi Display Sink by relay through the WDC is the same as the previous, except that the WDC restarts the execution at the sentence "At this point in the amended protocol a restart may commence" in the description of implementation 6

Stopping the session for implementation 3 and 4 if no docked WD ever got as far as streaming audio and/or video to the Wi-Fi Display Sink by relay through the WDC is the same as the previous, except that the WDC restarts the execution at the sentence "At this point in the amended protocol a restart may commence" in the description of implementations 3 and 4 respectively.

Optionally the proposed system supports time synchronization. The Wi-Fi Display specification has options for time synchronization of local clocks in the source device and sink device. To preserve audio/video fidelity and compensate for jitter, the local clocks at the WFD Source and WFD Sink(s) may require such synchronization. For example, the synchronization may use the generalized Precision Time Protocol (gPTP) specified in IEEE 802.11AS [2], clause 12, "Media-dependent layer specification for IEEE 802.11 links" for time synchronization. Furthermore, IEEE 802.11v [3] describes Timing Measurement messages that WFD Sink exchanges with the WFD Source which are MAC based.

In Wi-Fi Display the Wi-Fi Display Source is the master clock (called grandmaster clock in 802.1AS [2]). Hence the WD is de grandmaster clock for the WDC, while during relaying the WDC is the grandmaster clock for the Wi-Fi Display Sink. IEEE802.1AS [2] allows various devices being coupled via multiple links, while one of the devices is the grandmaster clock, using the Best master clock algorithm. Intermediate devices are Time-aware Bridges and end nodes are Time-aware end stations. An access point (AP) or WDC may assume the role of Time-aware Bridge see FIGS. 7.1 and 7.2 in 802.1AS [2]. When doing the Wi-Fi Display relay, the WDC can support this time synchronization in two ways.

Optionally, in the wireless docking system, the host processor is arranged for synchronization according to a predefined synchronization protocol by synchronizing a local host clock with a dockee clock via a first instance of the predefined synchronization protocol and synchronizing the local host clock with an audio/video peripheral clock via a second instance of the predefined synchronization protocol. Alternatively, the host processor is arranged for synchronization according to a predefined synchronization protocol by enabling synchronizing an audio/video peripheral clock with a dockee clock by relaying subsequent interrelated synchronization messages of the predefined synchronization protocol while maintaining a time relationship between the subsequent interrelated synchronization messages. Thereto the host may detect said time relationship between subsequent incoming interrelated synchronization messages from the dockee and subsequently relay the subsequent interrelated synchronization messages having a time relationship substantially equal to said detected time relationship.

In the first embodiment the WDC synchronizes its clock both with the WD and with the Wi-Fi Display Sink device in two different instantiations of the generalized Precision Time Protocol.

In the second embodiment the WDC relays the MAC messages of the generalized Precision Time Protocol using the MAC address substitution as described above.

For both options, clock jitter between the WD and the Wi-Fi Display Sink may be caused by jitter in timing of the messages on the link between WD and WDC and the link between WDC and Wi-Fi Display Sink. The advantage of the second option of using the MAC address substitution as described above is that there is no need to synchronize with a clock in the WDC or even have a clock in the WDC.

A Wi-Fi Display Sink may send a 'resync' request to the Wi-Fi Display Source, which may be accommodated by relaying the messages and using the address substitution as described above. For the two step synchronization the WDC may decide, if necessary, to further synchronize with the WD. If the clock of the WDC is correct the WDC will not execute the further synchronization. If the clock of the WDC needs to be adapted the WDC will execute the further synchronization. If so, timestamps of the WDC need to be kept continuous.

A method of wireless docking between a host device and a dockee device is based on wireless communication between a host device and one or more dockee devices. The host device and mobile device are as described above. A method of wireless docking for use the host in the wireless docking system as described above comprises
  docking the dockee and relaying data packets from the dockee to the audio/video peripheral and/or from the audio/video peripheral to the dockee,
  using, as a source address, a first host internet protocol address for the wireless communication while docking the dockee, and
  using, as a source address, a second host internet protocol address for the wireless communication for setting up a direct connection to the audio/video peripheral,
  providing the second host internet protocol address to the dockee.

A method of wireless docking for use the dockee in the wireless docking system as described above comprises
  docking with the host,
  communicating with the host using the first host internet protocol address as a destination address,
  receiving the second host internet protocol address from the host,
  using the second host internet protocol address as a source address for exchanging data packets with the audio/video peripheral while transferring the data packets via the host.

Although the invention has been mainly explained by embodiments using wireless docking, the invention is also suitable for any wireless system where wireless devices need to connect to, or share, one or more audio and/or video peripherals. It is to be noted that the invention may be implemented in hardware and/or software, using programmable components. A computer program product may comprise a program that is operative to cause a processor to perform one of the methods as described above.

It will be appreciated that the above description for clarity has described embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention can be implemented in any suitable form including hardware, software, firmware or any combination of these.

It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and the invention lies in each and every novel feature or combination of features described above or recited in mutually different dependent claims.

REFERENCE DOCUMENTS AND ABBREVIATIONS

[1] Wi-Fi Display Technical Specification issued by the Wi-Fi Alliance, e.g. version 1.1 dated 24 Apr. 2014.
[2] IEEE 802.1AS (2011) Timing and Synchronization for Time-Sensitive Applications in Bridged Local Area Networks, 30 Mar. 2011
[3] IEEE 802.11v-2011 Wireless LAN Medium Access Control (MAC) and Physical Layer (PHY) specifications, 9 Feb. 2011
[4] IP/Internet Protocol suite, defined in the INTERNET STANDARD RFC 768 by J. Postel, ISI, August 1980, and subsequent internet standards.
DHCP Dynamic Host Configuration Protocol
MAC Media Access Control
P2P GO Peer-to-Peer Group Owner
RTP Real-time Transport Protocol
RTSP Real Time Streaming Protocol
TCP Transmission Control Protocol
TDLS Tunneled Direct Link Setup
UDP User Datagram Protocol

The invention claimed is:

1. A wireless docking system, comprising:
a host for docking via a wireless communication, the host being configured for accommodating a wireless docking environment comprising at least one peripheral, the host including a host communication unit for accommodating the wireless communication and a host processor;
a dockee including a dockee communication unit for accommodating the wireless communication and a dockee processor configured for docking with the host;
wherein the host processor is configured for enabling the dockee to use the at least one peripheral and relaying data packets between the dockee and the at least one peripheral by:
using a first host internet protocol (IP) address as a source IP address of the host for the wireless communication while docking the dockee,
using a second host IP address as the source IP address of the host for setting up a direct connection to the at least one peripheral while the host operates as a data source towards the at least one peripheral, and
providing the second host IP address to the dockee;
and wherein the dockee processor is configured for:
communicating with the host using the first host IP address as a destination IP address,
receiving the second host IP address from the host, and
using the second host IP address as a source IP address of the dockee while exchanging data packets with the at least one peripheral via the host.

2. The wireless docking system as claimed in claim 1, wherein the data packets comprise control data packets and content data packets, the dockee includes a dockee IP address, and the dockee processor is configured to:
use the dockee IP address as the source IP address of the dockee for exchanging the control data packets with the at least one peripheral while transferring the control data packets via the host, and
use the second host IP address as the source IP address of the dockee for exchanging the content data packets with the at least one peripheral while transferring the content data packets via the host, and
the host processor is configured for, when relaying the control data packets,
replacing the dockee IP address by the second host IP address.

3. The wireless docking system as claimed in claim 1, wherein the data packets have a source link address on a link layer indicating a device link address of a device that originated the data packet and a destination link address indicating a device link address of a device that is the final destination of the data packet, and
the host processor is configured for:
receiving a data packet to be relayed from the dockee to the audio/video peripheral, the packet source link address being a dockee link address,
modifying the data packet source link address by replacing the dockee link address by a host link address used while setting up the direct connection between the host and the at least one peripheral, and
relaying the modified data packet to the at least one peripheral.

4. The wireless docking system as claimed in claim 1, wherein the data packets have a source link address on a link layer indicating a device link address of a device that originated the data packet and a destination link address indicating a device link address of a device that is the final destination of the data packet, and
the host processor is configured for:
receiving a data packet to be relayed from the at least one peripheral to the dockee, the packet destination link address being a host link address used while setting up the direct connection between the host and the peripheral,
modifying the data packet destination link address by replacing the host link address by the dockee link address, and
relaying the modified data packet to the dockee.

5. The wireless docking system as claimed in claim 1, wherein the host processor is configured for:
setting up a direct connection to the at least one peripheral and operate a predefined protocol of control data packets, the control data packets in the protocol comprising a sequence of request data packets and response data packets that are exchanged to subsequently enable exchanging content data packets, and including, in the sequence, additional data packets, the additional data packets causing the at least one peripheral to stay coupled to the host, or
selecting a set of capabilities that is common for dockees and start streaming content to the at least one peripheral using the set of capabilities, or
pausing the content when switching between the host and the dockee or vice versa.

6. The wireless docking system as claimed in claim 5, wherein the host processor is configured for repeating, as the additional control data packets, selected request data packets from the protocol.

7. The wireless docking system as claimed in claim 5, wherein the host processor is configured for:
- using an increasing sequence number while generating subsequent control data packets during said coupling, and
- transferring the actual sequence number to the dockee when starting to relay the data packets via the host, the dockee processor is configured for:
- receiving the actual sequence number from the host when starting to exchange data packets with the at least one peripheral, and
- using and further increasing the actual sequence number while generating subsequent data packets during said exchanging data packets with the at least one peripheral.

8. The wireless docking system as claimed in claim 1, wherein the host processor is configured for:
- receiving, during relaying the data packets, a teardown control data packet from the dockee indicating that the dockee is terminating the use of the at least one peripheral,
- transmitting a teardown response control data packet to the dockee while not relaying the teardown control data packet to the at least one peripheral, and
- transmitting further additional data packets to the at least one peripheral, the further additional data packets causing the at least one peripheral to stay connected to the host.

9. The wireless docking system as claimed in claim 8, wherein the host processor is configured for repeating, as the further additional data packets, selected request data packets from the protocol that enable redefining settings of the at least one peripheral.

10. The wireless docking system as claimed in claim 1, wherein the host processor is configured for synchronization according to a predefined synchronization protocol by:
- synchronizing a local host clock with a dockee clock via a first instance of the predefined synchronization protocol and synchronizing the local host clock with a peripheral clock via a second instance of the predefined synchronization protocol, or
- enabling synchronizing the peripheral clock with the dockee clock by relaying subsequent interrelated synchronization messages of the predefined synchronization protocol while maintaining a time relationship between the subsequent interrelated synchronization messages.

11. A host in a wireless docking system, the host comprising:
- a host communication unit for accommodating a wireless communication in the wireless docking system,
- a host processor configured for, in a docking session, docking a dockee and relaying data packets between the dockee and a peripheral, the host processor being configured for:
- using a first host IP address as a source IP address of the host for the wireless communication while docking the dockee,
- using a second host IP address as the source IP address of the host for the wireless communication for setting up a direct connection to the peripheral, while the host operates as a data source towards the peripheral, and
- providing the second host IP address to the dockee.

12. A dockee in a wireless docking system, the dockee comprising:
- a dockee communication unit for accommodating a wireless communication in the wireless docking system,
- a dockee processor configured for, in a docking session, docking with a host, the dockee processor being configured for:
- communicating with the host using a first host IP address as a destination IP address,
- receiving a second host IP address from the host,
- using the second host IP address as a source IP address of the dockee when exchanging data packets with a peripheral while transferring the data packets via the host.

13. A method for wireless docking for use in a host in a wireless docking system, the method comprising:
- docking a dockee and relaying data packets between the dockee and a peripheral,
- using a first host IP address as a source IP address of the host for a wireless communication while docking the dockee,
- using a second host IP address as the source IP address of the host for the wireless communication for setting up a direct connection to the peripheral while the host operates as a source towards the peripheral,
- providing the second host IP address to the dockee.

14. A method for wireless docking for use in a dockee in a wireless docking system, the method comprising:
- docking with a host,
- communicating with the host using a first host IP address as a destination IP address,
- receiving a second host IP address from the host,
- using the second host IP address as a source address for exchanging data packets with a peripheral while transferring the data packets via the host.

15. A non-transitory computer-readable medium having one or more executable instructions stored thereon, which when executed by a processor, cause the processor to perform a method for wireless docking for use in a host in a wireless docking system, the method comprising:
- docking a dockee and relaying data packets between the dockee and a peripheral;
- using a first host IP address as a source IP address of the host for a wireless communication while docking the dockee;
- using a second host IP address as the source IP address of the host for the wireless communication for setting up a direct connection to the peripheral while the host operates as a data source towards the peripheral; and
- providing the second host IP address to the dockee.

16. A non-transitory computer-readable medium having one or more executable instructions stored thereon, which when executed by a processor, cause the processor to perform a method for wireless docking for use in a dockee in a wireless docking system, the method comprising:
- docking with a host;
- communicating with the host using a first host IP address as a destination IP address;
- receiving a second host IP address from the host; and
- using the second host IP address as a source address for exchanging data packets with a peripheral while transferring the data packets via the host.

* * * * *